(12) United States Patent
Liu et al.

(10) Patent No.: US 11,057,332 B2
(45) Date of Patent: Jul. 6, 2021

(54) AUGMENTED EXPRESSION STICKER CONTROL AND MANAGEMENT

(71) Applicant: International Business Machines Corporation, Armonk, NY (US)

(72) Inventors: Su Liu, Austin, TX (US); Qin Qiong Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 128 days.

(21) Appl. No.: 15/922,786

(22) Filed: Mar. 15, 2018

(65) Prior Publication Data

US 2019/0288973 A1    Sep. 19, 2019

(51) Int. Cl.
*H04L 12/58* (2006.01)
*G06K 9/00* (2006.01)

(52) U.S. Cl.
CPC .......... *H04L 51/18* (2013.01); *G06K 9/00315* (2013.01); *G06K 9/00677* (2013.01); *H04L 51/046* (2013.01); *H04L 51/08* (2013.01); *H04L 51/10* (2013.01); *H04L 51/16* (2013.01); *H04L 51/32* (2013.01)

(58) Field of Classification Search
CPC ......... H04L 51/18; H04L 51/10; H04L 51/32; H04L 51/08; H04L 51/046; H04L 51/16; G06K 9/00315; G06K 9/00677
See application file for complete search history.

(56) References Cited

U.S. PATENT DOCUMENTS

| 6,809,724 | B1 * | 10/2004 | Shiraishi ................. G06F 1/163 345/157 |
| 9,577,963 | B2 | 2/2017 | Dowdell |
| 9,794,202 | B1 | 10/2017 | Pereira et al. |

(Continued)

FOREIGN PATENT DOCUMENTS

| CN | 106415664 A | 2/2017 |
| KR | 20160037332 A | 4/2016 |

(Continued)

OTHER PUBLICATIONS

Liu et al, U.S. Appl. No. 15/590,908, filed May 9, 2017.

*Primary Examiner* — Patrice L Winder
*Assistant Examiner* — Angela M Widhalm De Rodrig
(74) *Attorney, Agent, or Firm* — Zilka-Kotab, P.C.

(57) ABSTRACT

In one embodiment, a system includes a processing circuit and logic integrated with the processing circuit, executable by the processing circuit, or integrated with and executable by the processing circuit. The logic is configured to cause the processing circuit to receive an expression sticker having metadata associated therewith and analyze the metadata to determine whether an augmented feature is specified by the metadata. The augmented feature is intended to be output in conjunction with display of the expression sticker. The logic is also configured to cause the processing circuit to output the expression sticker to a display of a first device and trigger a corresponding augmented unit of the first device to output the augmented feature in response to a determination that the augmented feature is specified by the metadata.

(Continued)

Other systems, methods, and computer program products for augmented expression sticker management are described in accordance with more embodiments.

19 Claims, 7 Drawing Sheets

(56) References Cited

U.S. PATENT DOCUMENTS

| | | | | |
|---|---|---|---|---|
| 10,171,877 | B1* | 1/2019 | Shah | H04N 21/4668 |
| 10,693,819 | B1* | 6/2020 | Boyd | H04L 51/18 |
| 2005/0079474 | A1* | 4/2005 | Lowe | A61B 5/16 |
| | | | | 434/236 |
| 2006/0170945 | A1* | 8/2006 | Bill | H04N 29/06 |
| | | | | 358/1.13 |
| 2007/0005702 | A1* | 1/2007 | Tokuda | H04L 51/14 |
| | | | | 709/206 |
| 2007/0022112 | A1* | 1/2007 | Asukai | G06F 16/40 |
| 2008/0162649 | A1* | 7/2008 | Lee | G06Q 10/107 |
| | | | | 709/206 |
| 2009/0055484 | A1* | 2/2009 | Vuong | G06Q 10/107 |
| | | | | 709/206 |
| 2009/0267758 | A1* | 10/2009 | Hyde | A61B 5/0002 |
| | | | | 340/539.12 |
| 2013/0076788 | A1* | 3/2013 | Ben Zvi | G06T 19/006 |
| | | | | 345/633 |
| 2014/0157153 | A1 | 6/2014 | Yuen et al. | |
| 2015/0277686 | A1* | 10/2015 | LaForge | G11B 27/34 |
| | | | | 715/723 |
| 2015/0294086 | A1* | 10/2015 | Kare | G06F 19/3481 |
| | | | | 705/3 |
| 2016/0026253 | A1* | 1/2016 | Bradski | H04N 13/344 |
| | | | | 345/8 |
| 2016/0055370 | A1 | 2/2016 | Garcia | |
| 2016/0072903 | A1 | 3/2016 | Chakra et al. | |
| 2016/0150281 | A1* | 5/2016 | Whaley | H04N 21/4788 |
| | | | | 715/719 |
| 2016/0210962 | A1 | 7/2016 | Kim et al. | |
| 2016/0352667 | A1 | 12/2016 | Pickett et al. | |
| 2016/0359777 | A1 | 12/2016 | Tucker et al. | |
| 2017/0034084 | A1 | 2/2017 | Brunsen | |
| 2017/0060839 | A1* | 3/2017 | Kawamura | G06F 40/30 |
| 2017/0131103 | A1* | 5/2017 | Kurata | G01C 21/165 |
| 2017/0330160 | A1* | 11/2017 | Sueyoshi | G06Q 30/02 |
| 2017/0347427 | A1* | 11/2017 | Cole | H04N 21/4131 |
| 2018/0025219 | A1* | 1/2018 | Baldwin | C23C 8/36 |
| 2018/0027307 | A1* | 1/2018 | Ni | H04N 21/4788 |
| | | | | 345/419 |
| 2018/0071425 | A1* | 3/2018 | Jin | A61L 9/14 |
| 2018/0083901 | A1* | 3/2018 | Mcgregor, Jr. | G06K 9/726 |
| 2018/0096533 | A1* | 4/2018 | Osman | A63F 13/25 |
| 2018/0131847 | A1* | 5/2018 | Kokonaski | H04N 5/23241 |
| 2018/0133900 | A1* | 5/2018 | Breazeal | B25J 11/0005 |
| 2018/0294986 | A1* | 10/2018 | Vidro | A63F 13/87 |
| 2018/0367483 | A1* | 12/2018 | Rodriguez | H04L 51/04 |
| 2019/0012834 | A1* | 1/2019 | Friedman | A63F 13/211 |
| 2019/0102928 | A1* | 4/2019 | Blackshaw | G06F 3/011 |
| 2019/0121522 | A1* | 4/2019 | Davis | G06F 3/04815 |
| 2019/0189259 | A1* | 6/2019 | Clark | G16H 10/60 |
| 2019/0238952 | A1* | 8/2019 | Boskovich | G06K 9/00201 |
| 2019/0378097 | A1* | 12/2019 | Roberson | G06Q 30/0207 |

FOREIGN PATENT DOCUMENTS

| | | |
|---|---|---|
| WO | 2014180377 A1 | 11/2014 |
| WO | 2017153771 A1 | 9/2017 |

* cited by examiner

AUGMENTED EXPRESSION STICKER CONTROL AND MANAGEMENT

BACKGROUND

The present invention relates to chat sessions and related activities, and more specifically to augmented expression sticker control and management.

Applications that allow for exchanging messages with other users in a chat session (chatting) and/or exchanging instant messages (IMs) with other users are useful for the exchange of ideas. Social media networks and chatting applications, such as WeChat©, WhatsApp©, Facebook©, etc., are the most popular and are messaging applications used today, and there are many hundreds of more such messaging applications, specific to particular languages, communities, interests, etc.

Many of the messaging applications include functionality that allows users to send and receive emoticons, emoji, and in some cases dynamic expression stickers, or just stickers for short.

Emoticons are typographic displays, typically a representation of a facial expression, and are used to convey emotion in a text-only medium. Emoticons may be input using a standard character set, such as with a combination of characters and symbols found on a standard keyboard, e.g., ;-) or :-( or ^_^, etc.

An emoji is a picture character or pictograph that is displayed to a user and may represent any of a plurality of different items, expressions, people, places, etc. Emoji are an extension to the character set typically used by most common operating systems, Unicode, and are represented in Unicode by a single character. There are a limited number of emoji available, and they are typically input using a dedicated interface which displays emoji available for input or via shortcut keystrokes in the specific messaging application being used, e.g., U+2764 is a heavy black heart, U+1F43B is a bear face, etc.

Expression stickers, which are referred to as stamps in some areas, are not characters, but rather are unstructured data. They are used in a number of messaging applications that are able to recognize and process the expression sticker data. They may include audio, picture(s), video, or some combination thereof. A typical expression sticker may be a detailed image of a character that represents an emotion or action. Expression stickers have a limitless ability to convey very specific emotions, feelings, and thoughts because there is no limit to the number that may be produced, unlike emoticons and emoji. Expression stickers typically include elaborate, character-driven graphics and give users a quick and easy way to convey emotion, feelings, and/or specific thoughts.

Expression stickers may be created by virtually anyone: celebrities, comic producers, film studios, companies, messaging applications, internet providers, content providers, users, or any other interested party, and may be based on almost any content or event, such as film, television, and video screenshots, comic book pages, cultural events, counter-culture movements, self-produced image(s), etc., and may be accompanied by audio or text to provide very individualized expressions. Therefore, the content and number of expression stickers available and where they are available at any one time is very dynamic and changes daily. Many thousands of new expression stickers are created every day, while some expression stickers are removed from use, restricted, required to be paid for in order to continue using, etc., effectively removing them from availability for some or all users.

However, even with the vast number of expression stickers available, the limited number of expression stickers that are available to a user across the various messaging applications accessible by the user may not precisely represent a feeling of the user at a specific time, and the full functionality of a device on which the expression stickers are output may not be utilized with current expression sticker management techniques.

SUMMARY

In one embodiment, a system includes a processing circuit and logic integrated with the processing circuit, executable by the processing circuit, or integrated with and executable by the processing circuit. The logic is configured to cause the processing circuit to receive an expression sticker having metadata associated therewith and analyze the metadata to determine whether an augmented feature is specified by the metadata. The augmented feature is intended to be output in conjunction with display of the expression sticker. The logic is also configured to cause the processing circuit to output the expression sticker to a display of a first device and trigger a corresponding augmented unit of the first device to output the augmented feature in response to a determination that the augmented feature is specified by the metadata.

In another embodiment, a method includes receiving an expression sticker having metadata associated therewith and analyzing the metadata to determine whether an augmented feature is specified by the metadata. The augmented feature is intended to be output in conjunction with display of the expression sticker. The method also includes outputting the expression sticker to a display of a first device and triggering a corresponding augmented unit of the first device to output the augmented feature in response to a determination that the augmented feature is specified by the metadata.

In yet another embodiment, a computer program product includes a computer readable storage medium having program instructions embodied therewith. The computer readable storage medium is not a transitory signal per se, and the embodied program instructions are executable by a processing circuit to cause the processing circuit to receive, by the processing circuit, an expression sticker having metadata associated therewith. The embodied program instructions are also executable by the processing circuit to cause the processing circuit to analyze, by the processing circuit, the metadata to determine whether an augmented feature is specified by the metadata. The augmented feature is intended to be output in conjunction with display of the expression sticker. The embodied program instructions are further executable by the processing circuit to cause the processing circuit to output, by the processing circuit, the expression sticker to a display of a first device, and trigger, by the processing circuit, a corresponding augmented unit of the first device to output the augmented feature in response to a determination that the augmented feature is specified by the metadata.

With these augmented expression sticker management techniques, the feelings and emotions of a user may be more precisely conveyed via display of one or more expression stickers along with output of augmented features on a receiving device. Moreover, selection of certain augmented features may convey particular feelings or emotions, while other augmented features may be used for other feelings or emotions, allowing a user who receives an augmented expression sticker to more fully understand the feelings and emotions of the user who sent the augmented expression sticker. In addition, the display of an expression sticker may be significantly modified by output of one or more augmented features, thereby providing for more variety while using a limited number of expression stickers.

Other aspects and embodiments of the present invention will become apparent from the following detailed description, which, when taken in conjunction with the drawings, illustrate by way of example the principles of the invention.

DETAILED DESCRIPTION

Figure 1:
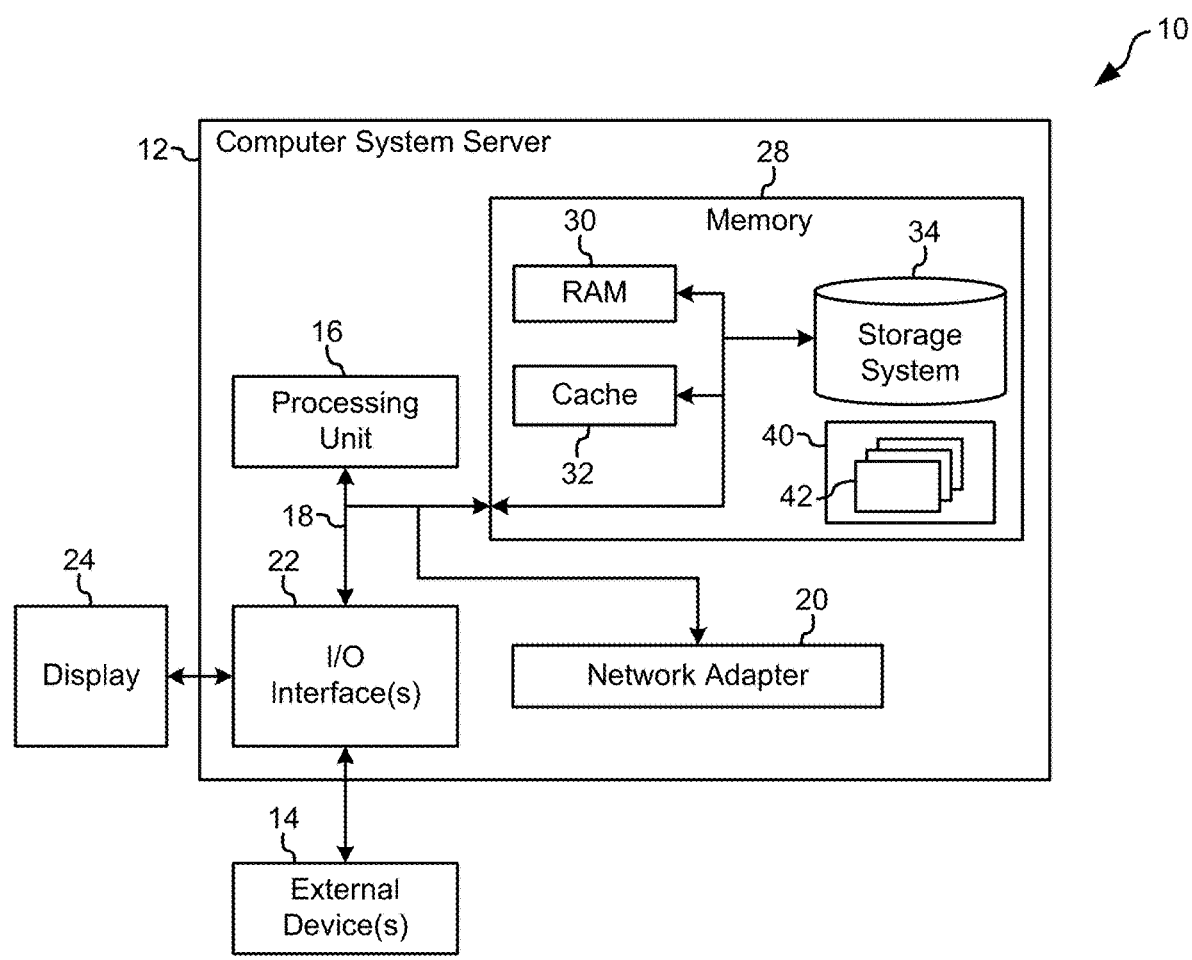
FIG. 1 depicts a cloud computing node according to an embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "about" as used herein indicates the value preceded by the term "about," along with any values reasonably close to the value preceded by the term "about," as would be understood by one of skill in the art. When not indicated otherwise, the term "about" denotes the value preceded by the term "about"±10% of the value. For example, "about 10" indicates all values from and including 9.0 to 11.0.

The following description discloses several preferred embodiments of systems, methods, and computer program products that provide augmented expression sticker management and control. Most messaging applications are capable of creating a chat session or instant messaging (IM) session that includes user-selected expression stickers. However, the various expression stickers available to any one user may not fully express the user's emotions, nor utilize the full breadth of output capabilities of the device on which the expression sticker is received and/or output.

In one general embodiment, a system includes a processing circuit and logic integrated with the processing circuit, executable by the processing circuit, or integrated with and executable by the processing circuit. The logic is configured to cause the processing circuit to receive an expression sticker having metadata associated therewith and analyze the metadata to determine whether an augmented feature is specified by the metadata. The augmented feature is intended to be output in conjunction with display of the expression sticker. The logic is also configured to cause the processing circuit to output the expression sticker to a display of a first device and trigger a corresponding augmented unit of the first device to output the augmented feature in response to a determination that the augmented feature is specified by the metadata.

In another general embodiment, a method includes receiving an expression sticker having metadata associated therewith and analyzing the metadata to determine whether an augmented feature is specified by the metadata. The augmented feature is intended to be output in conjunction with display of the expression sticker. The method also includes outputting the expression sticker to a display of a first device and triggering a corresponding augmented unit of the first device to output the augmented feature in response to a determination that the augmented feature is specified by the metadata.

In yet another general embodiment, a computer program product includes a computer readable storage medium having program instructions embodied therewith. The computer readable storage medium is not a transitory signal per se, and the embodied program instructions are executable by a processing circuit to cause the processing circuit to receive, by the processing circuit, an expression sticker having metadata associated therewith. The embodied program instructions are also executable by the processing circuit to cause the processing circuit to analyze, by the processing circuit, the metadata to determine whether an augmented feature is specified by the metadata. The augmented feature is intended to be output in conjunction with display of the expression sticker. The embodied program instructions are further executable by the processing circuit to cause the processing circuit to output, by the processing circuit, the expression sticker to a display of a first device, and trigger, by the processing circuit, a corresponding augmented unit of the first device to output the augmented feature in response to a determination that the augmented feature is specified by the metadata.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to the one or more processors or processing units 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
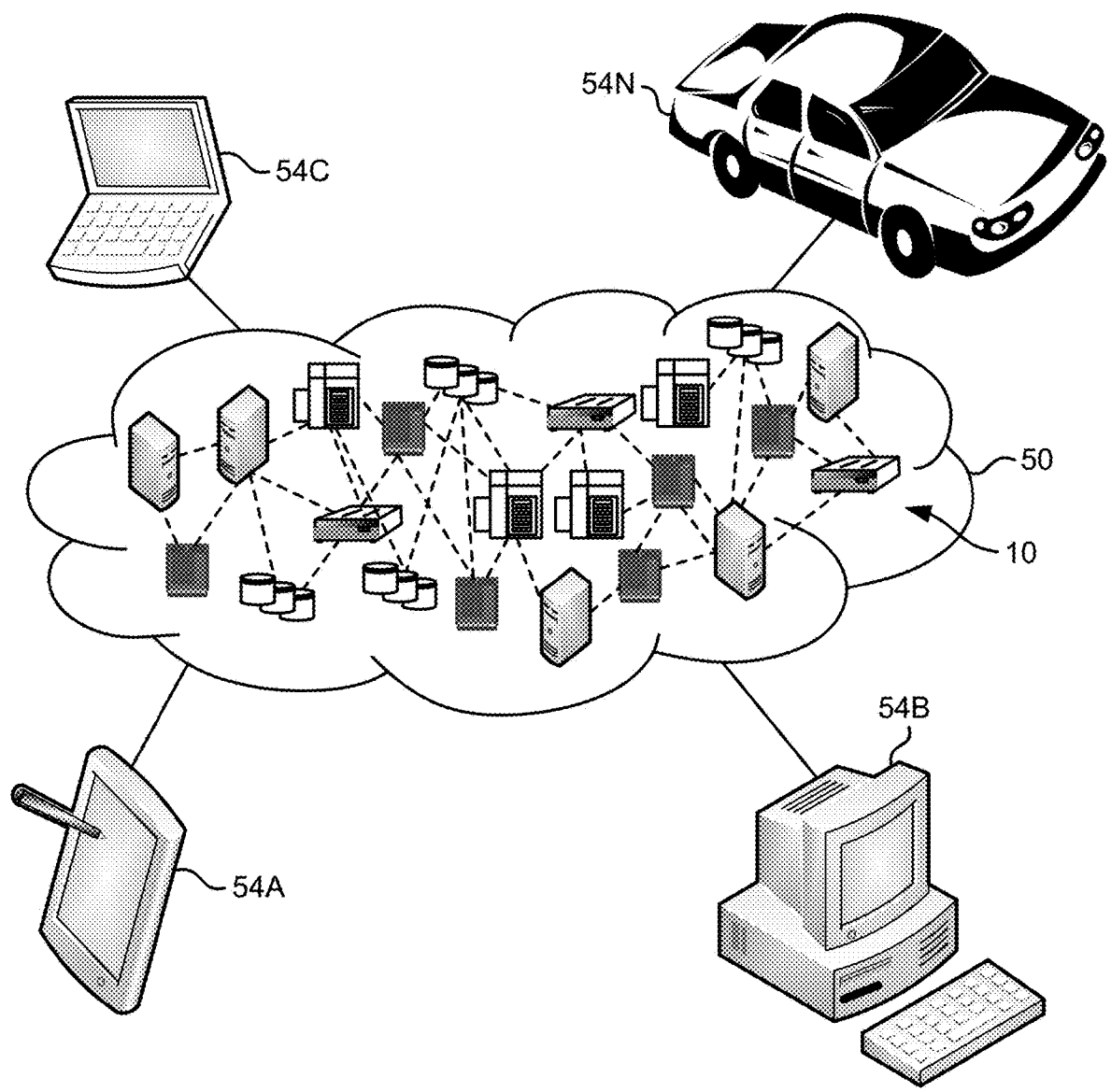
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
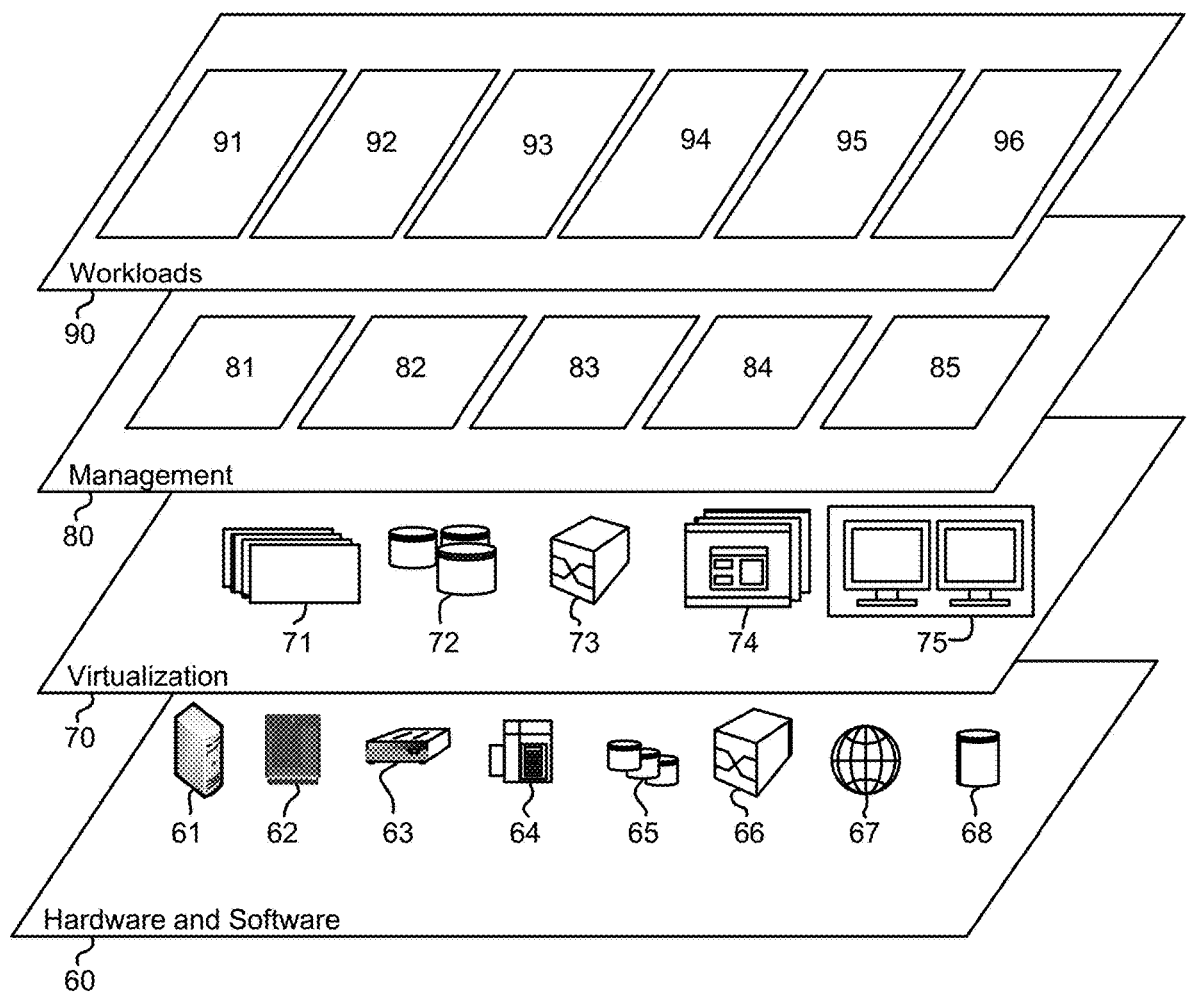
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and augmented expression sticker control and management 96.

Expression stickers are popular for expressing emotion and feeling (like, dislike, sadness, happiness, etc.) on social media all across the world, and especially in the United States, China, South Korea, and Japan. There are over 700 million monthly active users (MAUs) on WeChat® with over 1.6 billion active accounts. Moreover, more than 1.18 billion people log onto Facebook daily generating about 4.5 billion likes each day. These social media applications, along with other dedicated messaging applications, provide an amazingly large number of users who make use of expression stickers. A lot of vendors produce a huge number of expression stickers for selling and downloading purposes across a vast array of different distribution and accumulation platforms. Also, many users are creating, downloading, uploading, and sharing new expression stickers across all forms of social media.

For example, users are shopping, exchanging, downloading, collecting, and using expression stickers to communicate with one another. Most current input methods for messaging applications attempt to support expression stickers. Users are able to select and input downloaded expression stickers and expression stickers available in the cloud via one or more input interfaces of the application and/or operating system of the device on which the expression sticker is selected.

Expression sticker management (such as collecting, cataloging, understanding, searching, selecting, and deleting) is a new endeavor for mobile vendors, application (app) developers for use on mobile devices, linguists, and support personnel worldwide. Other related areas will also be affected by the demand for expression stickers, such as deep learning and auto-didacticism-based knowledge management, etc. Cloud search and support application programming interfaces (APIs) will also be expanded to allow applications to match search queries against real-time data streams, such as those provided on social media, big-data analytics, deep question and answer (Q&A), machine translation, etc.

In order to provide effective expression sticker management, there are several factors to consider: 1) the ease of use for the user, 2) the ability to collect and store the expression stickers from any of the plurality of suppliers thereof, and 3) the ability to access, sort, and utilize stored expression stickers in any operating messaging application from amongst the plurality of messaging applications available for use. Users want as easy of an experience as possible when collecting, storing, cataloguing, searching, selecting, and using an expression sticker in an active chat or instant messaging session.

The expansion in the use of expression stickers worldwide has introduced opportunities to expand and enhance functionality and use of the expression stickers. Although expression stickers are able to convey a person's feelings, they may not adequately convey a user's emotion(s) due to ambiguity in the selection of the expression stickers available. Moreover, users may spend a long time trying to guess the real emotions of the user whom sent the expression sticker upon receiving it, and an incorrect guess may lead to an uncomfortable situation between the sending and receiving users.

Many modern mobile devices, wearable devices, and other devices capable of outputting expression stickers include additional output functionality beyond the ability to display an expression sticker (hereafter "augmented features"). For example, some devices are capable of vibrating, playing audio, engaging one or more external lights that are capable of displaying one or more colors, outputting a scent or aroma, outputting a taste or flavor, etc. However, these augmented features are not currently utilized by some conventional expression stickers, and many devices do not understand or have the ability to include these augmented features when outputting an expression sticker.

In order to overcome these deficiencies in the current methods of managing and controlling expression stickers, the following embodiments describe augmented expression sticker control and management which makes use of the augmented features available for expression sticker output.

According to one embodiment, a method of augmented expression sticker control and management is described that provides for real time expression sticker augmentation. In one approach, an expression sticker that is received may be combined with augmented features and/or converted into an augmented expression sticker in real time to provide real-world physical sensory stimulations (such as additional lighting, vibration, smell, taste, etc.) to enable the receiver to better understand and comprehend the emotions of the sender.

This method may include definition of a new expression sticker data structure to handle expression attributes, which are able to store and output image(s), video, and/or audio, along with context stored as metadata, which may control additional lighting, vibration, scent, and taste. This context allows for the sender's emotion to be more completely conveyed to the receiver. Also, the method may include provision of a configuration user interface for controlling and managing the augmented expression sticker service, tracking of conversations and contexts thereof from multiple chat and/or IM threads for identification of sender emotional factors, evaluating a mode and level of a sender's emotion based on real-time conversation contexts and emotional records, recommendation of suitable expression sticker(s) to the sender for selection thereof within a chat and/or IM application, provision of a selection interface to select an expression sticker, and integration of the expression sticker attributes into the selected expression sticker as metadata to be output by the receiver device. In addition, the method may include sending the selected expression sticker and metadata to the receiver device. Then, on the receiver device, the expression sticker is output along with the metadata in an appropriate way (depending on the content of the metadata and how it is provided to the receiver).

Figure 4:
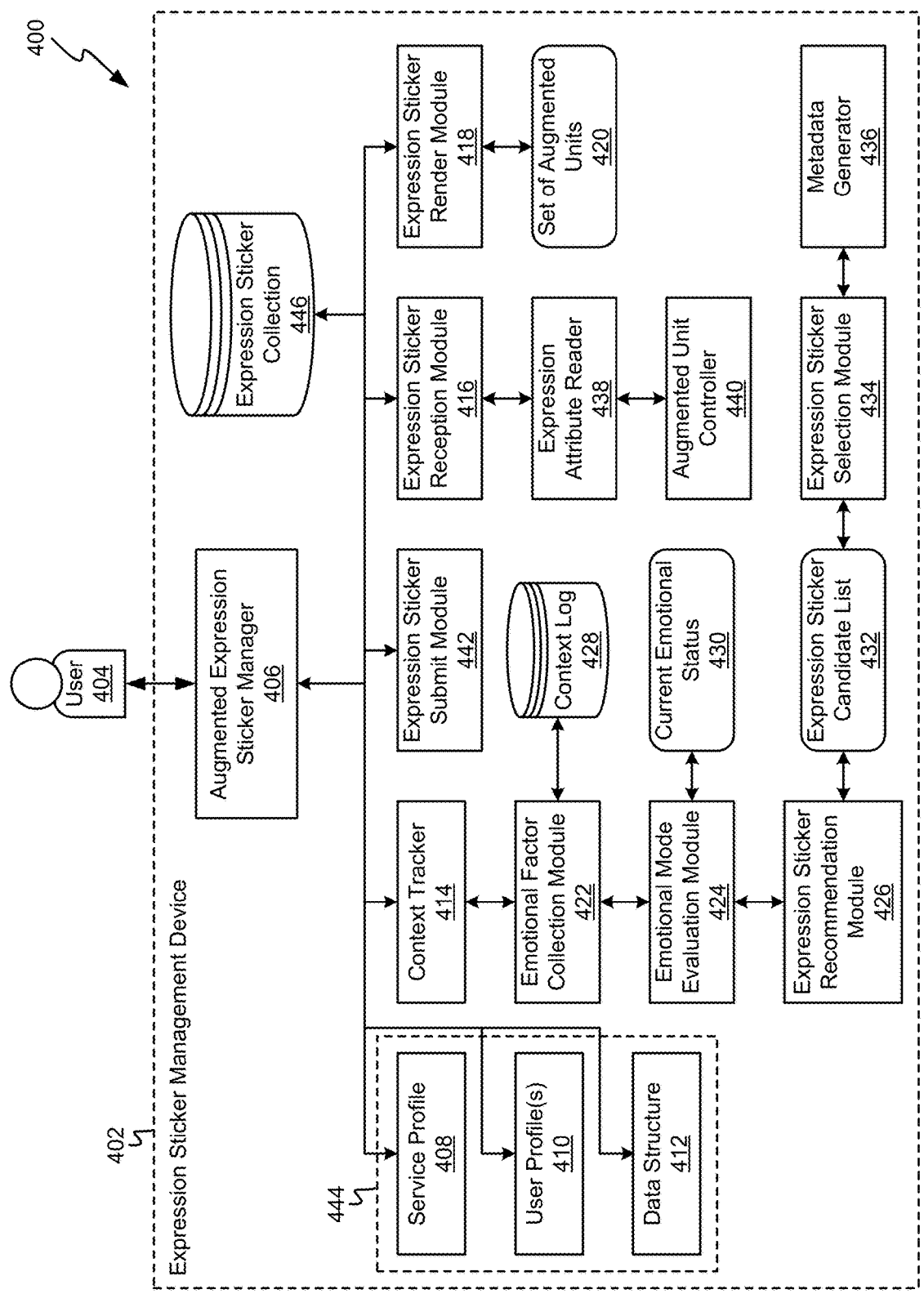
FIG. 4 shows a block diagram of an architecture, according to one embodiment.

Now referring to FIG. 4, a block diagram of an architecture 400 that is configured for augmented expression sticker management is shown according to one embodiment. The architecture 400 is configured to provide expression sticker control and management that enables augmented features. The architecture 400 includes an expression sticker management device 402, which may include one or more processing circuits, such as a microprocessor, a central processing unit (CPU), an application specific integrated circuit (ASIC), a field programmable gate array (FPGA), etc., combinations thereof, or any other suitable processor known in the art.

The expression sticker management device 402 may be any device known in the art which is configured to receive and/or send expression stickers, such as during a chat session, within an IM, in a social media application (such as Facebook®, Google® Hangouts®, Instagram®, Snapchat®, WeChat®, Periscope®, Twitter®, WhatsApp®, Tumblr®, etc.) Moreover, the expression sticker management device 402 is configured to be interacted with by one or more users 404, such as via an interface of the expression sticker management device 402, which may include a touchscreen, an audio input device, a keyboard (real or virtual), a mouse, or any other interface device known in the art.

In the descriptions that follow, both a receiver's device first device which receives an expression sticker and a sender's device which sends an expression sticker may comprise the expression sticker management device 502, or some portion thereof to provide the functionality to send and/or receive augmented expression stickers as described herein in accordance with various embodiments.

The augmented expression sticker manager 406 is configured to provide a configuration interface (e.g., a graphical user interface (GUI), voice-to-text functionality that understands voice commands, or some other suitable interface) that enables the user 404 to control and manage the augmented expression sticker service provided on the expression sticker management device 402. In some cases, the user 404 may act to send an augmented expression sticker. In other cases, the user 404 may act to receive an augmented expression sticker.

The expression sticker management device 402 may include a memory 444 that may include any type of memory described herein or otherwise known in the art. Within this memory 444, one or more service profiles 408, one or more user profiles 410, and the data structure 412 are stored for use in expression sticker management.

The service profile 408 provides rules for receiving and sending augmented expression stickers, and the user profile 410 provides information about authorized users and stores which augmented expression stickers are available for each individual user of the expression sticker management device 402. Moreover, the service profile 408 may also include which augmented features are available for any particular user, which may be based on user type, user experience, or some other categorization known in the art.

The rules may include, but are not limited to, how, where, when, and what to collect, catalog, normalize, sort, search, recommend, select, sort, etc., as it relates to expression stickers. The rules may be linked to a specific user profile 410 when the user specifies certain aspects of one service profile 408. In addition, a default set of expression sticker management criteria is also stored in the memory 444 for use in expression sticker management when no user profile exists, or no rule is specified in a service profile 408 that overrides the default management rules.

Each user profile 410 is a file or information construct that includes service criteria and other personal characteristics of a particular user. For example, various characteristics, personalities, likes, dislikes, favorites, etc., may be determined for a particular user and stored to the user profile 410 for that user. Some exemplary information that may be included in a user profile 410 includes, but is not limited to, native language, preferred language, age, gender, education, social media applications used, expression sticker resource sites used, channels used to obtain expression stickers, preferences on types of expression stickers to collect, etc.

The expression sticker management device 402 also includes an expression sticker collection 446, which includes a set of expression stickers which have been collected, purchased, traded, obtained, acquired, or otherwise received from one or more of a plurality of different expression sticker resources (e.g., messaging applications, social media websites, Internet websites generally, friends, co-workers, content providers, etc.), via one or more of a plurality of different channels (e.g., chatting sessions, file transfer protocol (FTP), connected devices like memory, computers, etc., via download from a website, via download from an expression sticker sever, via email, via text, etc.) according to related expression sticker management rules.

The data structure 412 includes a definition of a file structure that provides the format and instructions on how to handle an expression sticker that includes augmented features as metadata, e.g., expression attributes which may be referred to as "expression_data_structure." It is able to designate which augmented feature is specified by the accompanying expression sticker, when this feature is enacted, and how it is enacted, for each expression sticker using metadata. In some embodiments, the expression_data_structure may be configured in C-language to include an identifier of the expression sticker ("image_ID") to which it is correlated. Moreover, the expression_data_structure may be formatted as a list, a string, or some other known data format. The expression_data_structure may be a "pseudo" data structure which makes use of existing structures to convey information about which augmented features are to be included with the expression sticker, which may be included as one or more files formatted according to known formats, such as .GIF, .JPG, .HTML, etc.

Augmented features may include additional image(s) (in addition to the expression sticker which may already include a plurality of images, such as in .GIF format or some other suitable moving image format), secondary light(s), color(s) to be displayed with the expression sticker, sound to be played with the expression sticker, vibration to be felt during display of the expression sticker, taste, smell, etc., which may be expressed as metadata with the expression sticker to form an augmented expression sticker in accordance with the expression_data_structure. These augmented features attempt to more fully capture a sender's context (which includes the situation in which the expression sticker is being sent, current conditions for the sender—e.g., temperature, weather, time of day, location, etc.), a sender's feeling(s), and a sender's emotion(s), which may be gleaned from cues taken from the sender's actions, appearance, etc.

The context tracker 414 is configured to track ongoing, active conversation contexts from multiple chat and IM threads for identifying an expression sticker sender's emotional factors. These emotional factors may be gleaned from the context of the conversation, using any known indicators of emotion, such as capital letters, exclamation points, question marks, emojis which indicate certain emotions, facial expressions while providing the text of the conversation or images included in the conversation, yelling while dictating a message, etc.

The emotional factor collection module 422 is configured to collect the sender's current emotional factors as determined by the context tracker 414 and use these current emotional factors to determine a current emotion for the user at any given time during the chat and/or IM conversation based on some predetermined algorithm, mathematical correlation, or some other suitable way of translating the emotional factors into one or more current emotions for the user. The emotional factor collection module 422 stores these current emotions in the context log 428, which may include a history of the chat and/or IM conversation, and current determined emotions of the user for each segment of the conversation.

The emotional mode evaluation module 424 is configured to evaluate the sender's emotional mode and level of emotion based on real time conversational contexts and emotional records. For example, this module may determine levels of an emotion (on a predetermined scale, e.g., 0-5, 0-10, etc., or percentage wise), along with the underlying emotion that is dominantly displayed by the sender (e.g., anger, happiness, sadness, confusion, contempt, appreciation, intrigue, surprise, sympathy, etc.).

The current emotional status is determined by the emotional mode evaluation module 424 and indicates the sender's current emotional mode and the sender's current emotional level.

Because an expression sticker can have multiple applicable meanings, this module may attribute more than one emotion for the user, as appropriate. For example, an expression sticker of a smiling face may be attributed a meaning of "happy" and a meaning of "funny," as a smiling face may be used to denote either feeling, and therefore a user who selects a smiling face expression sticker may also have more than one emotion. Of course, many more such situations may arise, and the emotional mode evaluation module 424 is configured to deal with each situation distinctly for the user in associating an emotion to an expression sticker.

In one embodiment, the emotional mode evaluation module 424 is configured to utilize any number of indicia of meaning to determine the sender's current emotional mode and the sender's current emotional level. Some exemplary indicia that may be used to determine emotion include, but are not limited to, a description associated with an expression sticker, content of the expression sticker, an image of the expression sticker, context information related to the expression sticker, facial expression of the sender when selecting the expression sticker as detected by a user-facing camera on the expression sticker management device 402, use of punctuation in a message, chat session, IM, etc.

In one embodiment, as shown in Table 1 below, various emotional levels are shown along with augmented features which may be utilized to enhance an expression sticker based on the user's current emotional status. Table 1 uses five emotional levels as an example, but any reasonable number of emotional levels may be represented in such a table. Moreover, some augmented features may utilize less than a total number of emotional levels. For example, as shown in Table 1, the vibration strength only has three levels, and therefore for emotional level 2 and 4, the lowest and middle strengths are duplicated for a second emotional level. Of course, more methods of segregating emotional levels to different numbers of reproducible augmented feature strengths is possible, as would be understood by one of skill in the art upon reading the present descriptions.

TABLE 1

| Emotional Level/ Augmented Feature | 1 | 2 | 3 | 4 | 5 |
|---|---|---|---|---|---|
| Vibration Strength | Low | Low/ Medium | Medium | Medium/ High | High |
| External Light Color | Blue | Violet | Red | Orange | Yellow |
| Sound Volume | Low | Low/ Medium | Medium | Medium/ High | High |
| Smell/Scent | Citrus | Flowers | Baking | Foul | Smoke |
| Taste | Bitter | Salty | Sweet | Savory | Sour |
| Expression Sticker Surrounding Color | Blue | Violet | Red | Orange | Yellow |

The various emotional levels and augmented features shown in Table 1 are exemplary only, and any number of emotional levels and augmented features may be used, depending on a device's capabilities to utilize augmented features and the differentiation between the abilities of the augmented features. For example, an external LED of a mobile phone may be capable producing thousands of various hues and shades of colors, which may be represented digitally by 8 bits, 16 bits, etc., which may be indicated in the metadata along with the indication to activate the external LED of the mobile device.

In another example, a pattern, timing, number of times to repeat, etc., may be included in the descriptions of the metadata for each augmented feature therein, such that precise control of the augmented feature is able to be specified in the metadata (e.g., how long to activate the LED, how many times and how long for each vibration, The expression sticker recommendation module 426 is configured to recommend one or more suitable expression stickers to the sender for selection thereof, with each recommended expression sticker being related to the determined current emotional status 430. Moreover, the expression sticker recommendation module 426 is configured to sort through the expression sticker collection 446 for all expression stickers that have relevance with the determined current emotional status 430 of the sender.

The expression sticker candidate list 432 includes the narrowed-down list of suitable expression stickers provided by the expression sticker recommendation module 426 according to the sender's current emotional status. From this expression sticker candidate list 432, using the expression sticker selection module 434, the user may select one or more expression stickers to include in a conversation. After selection of the one or more expressions tickers, the metadata generator 436 creates metadata, according to the data structure 412, that integrates augmented features into the expression sticker(s) selected. The augmented features may vary based on the sender's current emotional status.

The expression sticker submit module 442 is configured to submit the selected expression sticker with the accompanying metadata to a second device ("the receiver"). The expression sticker submit module 442 may use any known transmission technique, such as via the Internet and other networks, Bluetooth and other radio frequency-based transmission techniques, infrared and other light-based transmission techniques, combinations thereof, etc.

The expression sticker reception module 416 is configured to receive an expression sticker with accompanying metadata from a second device. Upon reception thereof, the received expression sticker and accompanying metadata describing augmented features is sent to the expression attribute reader 438, which is configured to parse the metadata from the expression sticker to determine which augmented features are specified to be output along with the received expression sticker.

The augmented unit controller 440 is configured to control and trigger augmented units specified by the accompanying metadata to enable the augmented features. Some or all augmented features capable of being output by the expression sticker management device 402 may be controlled by the augmented unit controller 440, including, but not limited to, secondary or additional lighting (in addition to a display of the expression sticker management device 402, such as light emitting diodes (LEDs) of one or more colors, etc.), one or more screen colors that may partially or completely surround the expression sticker as it is displayed on the display of the expression sticker management device 402, vibration of the expression sticker management device 402, smell or scent emitted from the expression sticker management device 402, taste or flavor emitted from a suitable dispensing unit of the expression sticker management device 402, etc. Output, use, and/or control of each of these augmented features are contingent on the expression sticker management device 402 having the ability to output the specific augmented feature. In response to an expression sticker management device not having the ability to output one or more of the specified augmented features in the received expression sticker metadata, the expression sticker management device will display the expression sticker without augmenting it with the features which the device lacks.

For example, if a user sends an expression sticker depicting a rabbit throwing a carrot to the ground, and the sending device detects that the user is really unhappy or mad at a moment near (e.g., within 1 second, 5 seconds, 10 seconds, etc.) to the sending of the expression sticker, the sending device may include a vibration feature with the expression sticker having a strong level of vibration. When the expression sticker management device 402 receives the expression sticker of the rabbit and the metadata specifying a strong vibration feature, it may output the expression sticker and vibrate the device at a strong level, as opposed to vibration with a soft level.

The expression sticker render module 418 is configured to render and/or output the expression sticker on the expression sticker management device 402, e.g., on a display thereof. The set of augmented units 420 include all augmented units available on the expression sticker management device 402, as determined prior to sending and receiving expression stickers having augmented features.

Moreover, the expression sticker management device 402 is capable of sending an expression sticker that has augmented features specified to be output with the expression sticker even when the specific augmented feature is absent from the set of augmented units 420 for the expression sticker management device 402 that sends the expression sticker. In this way, the limited functionality of the expression sticker management device 402 does not inhibit its ability to designate such features for other users to enjoy when receiving expression stickers from the expression sticker management device 402.

Figure 5:
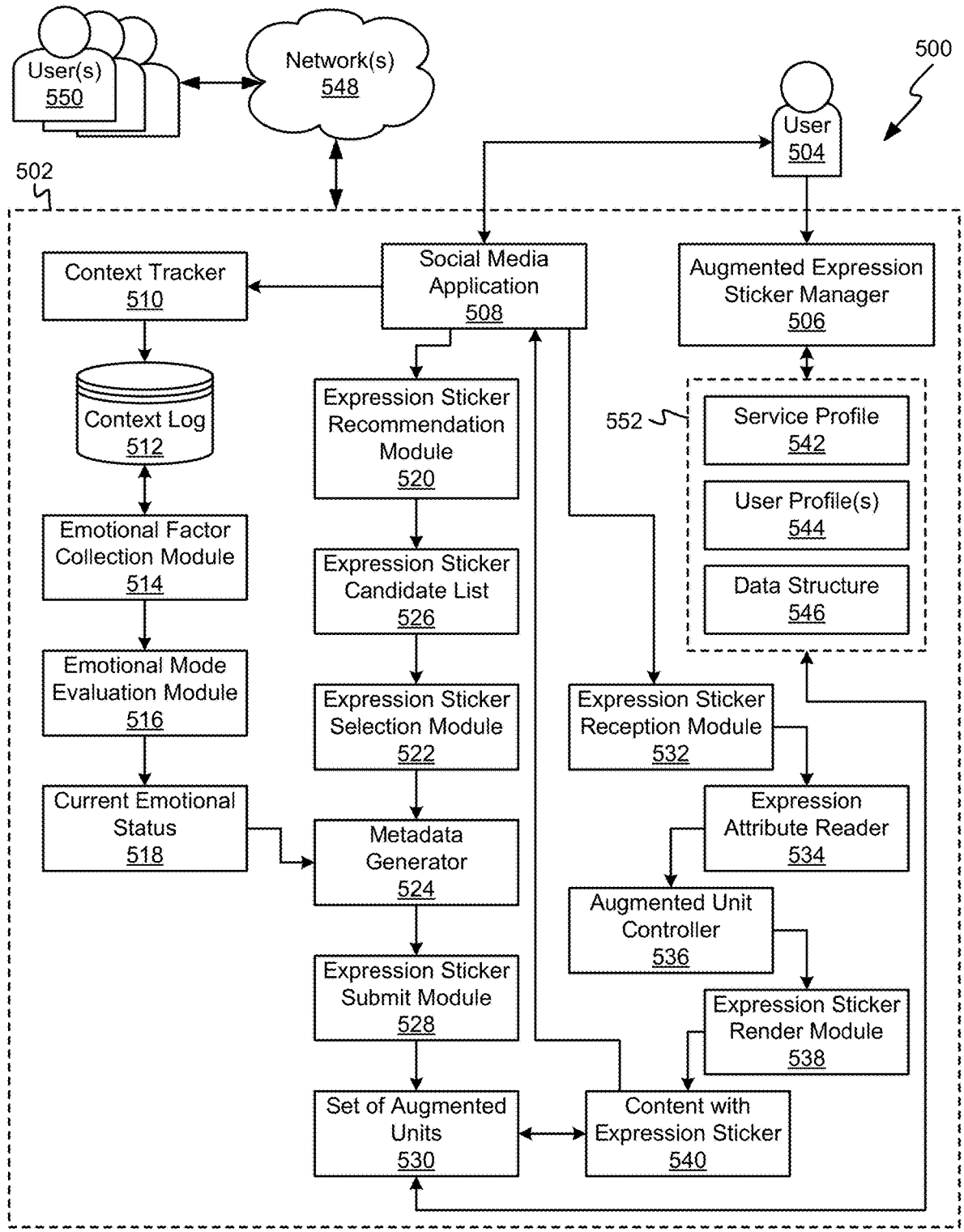
FIG. 5 shows a block diagram of another architecture, according to one embodiment.

Now referring to FIG. 5, a block diagram of an architecture 500 that is configured for augmented expression sticker management is shown in order to illustrate use of the expression sticker management device 502 included therein, according to one embodiment. The expression sticker management device 502 may include one or more processing circuits, such as a microprocessor, a CPU, an ASIC, a FPGA, etc., combinations thereof, or any other suitable processor known in the art.

The expression sticker management device 502 may be any device known in the art which is configured to receive and/or send expression stickers, such as during a chat session, within an IM, in a social media application (such as Facebook®, Google® Hangouts®, Instagram®, Snapchat®, WeChat®, Periscope®, Twitter®, WhatsApp®, Tumblr®, etc.) Moreover, the expression sticker management device 502 is configured to be interacted with by one or more users 504, such as via an interface of the expression sticker management device 502, which may include a touchscreen, an audio input device, a keyboard (real or virtual), a mouse, or any other interface device known in the art.

The augmented expression sticker manager 506 is configured to provide a configuration interface (e.g., a graphical user interface (GUI), voice-to-text functionality that understands voice commands, or some other suitable interface) that enables the user 504 to control and manage the augmented expression sticker service provided on the expression sticker management device 502.

The expression sticker management device 502 may include a memory 552 that may include any type of memory described herein or otherwise known in the art. Within this memory 552, one or more service profiles 542, one or more user profiles 544, and the data structure 546 are stored for use in expression sticker management, as described previously.

Augmented features may include additional image(s) (in addition to the expression sticker which may already include a plurality of images, such as in .GIF format or some other suitable moving image format), secondary light(s), color(s) to be displayed with the expression sticker, sound to be played with the expression sticker, vibration to be felt during display of the expression sticker, taste, smell, etc., which may be expressed as metadata with the expression sticker to form an augmented expression sticker in accordance with the expression_data_structure. These augmented features attempt to more fully capture a sender's context (which includes the situation in which the expression sticker is being sent, current conditions for the sender—e.g., temperature, weather, time of day, location, etc.), a sender's feeling(s), and a sender's emotion(s), which may be gleaned from cues taken from the sender's actions, appearance, etc.

The expression sticker management device 502 is able to receive and transmit data to one or more additional users 550 via one or more networks 548, of types known in the art, such as the Internet. The one or more additional users 550 may also utilize the social media application 508 or some application compatible with the social media application 508.

The user 504 interacts with a social media application 508, and through this application, the context tracker 510 tracks ongoing, active conversation contexts from multiple chat and IM threads for identifying an expression sticker sender's emotional factors, and stores this collected information to the context log 512. The emotional factor collection module 514 then uses the current collected emotional factors to determine a current emotion for the user 504 at any given time during the chat and/or IM conversation based on some predetermined algorithm, mathematical correlation, or some other suitable way of translating the emotional factors into one or more current emotions for the user 504.

The emotional mode evaluation module 516 evaluates the user's emotional mode and level of emotion based on real time conversational contexts and emotional records to generate the current emotional status 518, which is provided to the metadata generator 524 to create metadata based on the current emotional status 518.

When the user 504 chooses to send an expression sticker in a conversation, the expression sticker recommendation module 520 recommends one or more suitable expression stickers to the user 504 for selection thereof via the expression sticker selection module 522, with each recommended expression sticker being related to the determined current emotional status 518.

The expression sticker candidate list 526 includes a narrowed-down list of suitable expression stickers provided by the expression sticker recommendation module 520 according to the user's current emotional status 518. From this expression sticker candidate list 526, using the expression sticker selection module 522, the user 504 may select one or more expression stickers to include in a conversation. After selection of the one or more expression stickers, the metadata generator 524 adds the metadata to the chosen expression sticker(s), according to the data structure 546, that integrates augmented features into the expression sticker(s) selected. The augmented features may vary based on the sender's current emotional status 518.

The expression sticker submit module 528 submits the selected expression sticker with the accompanying metadata to a second device ("the receiver"), in addition to specifying which of the augmented units to specify as being used to output the augmented features, based on the set of augmented units 530. This generates the content (conversational input by the user 504) with the expression sticker 540.

In response to an expression sticker being received through the social media application 508, the expression sticker reception module 532 receives the expression sticker with accompanying metadata from a second device. Upon reception thereof, the received expression sticker and accompanying metadata describing augmented features is sent to the expression attribute reader 534, which parses the metadata from the expression sticker to determine which augmented features are specified to be output along with the received expression sticker.

The augmented unit controller 536 is activated to control and trigger augmented units specified by the accompanying metadata to enable the augmented features. The expression sticker render module 538 renders and/or outputs the expression sticker on the expression sticker management device 502, e.g., on a display thereof, along with the received content through the social media application 508, e.g., the content with the expression sticker 540. The set of augmented units 530 include all augmented units available on the expression sticker management device 502, as determined prior to sending and receiving expression stickers having augmented features.

Figure 6:
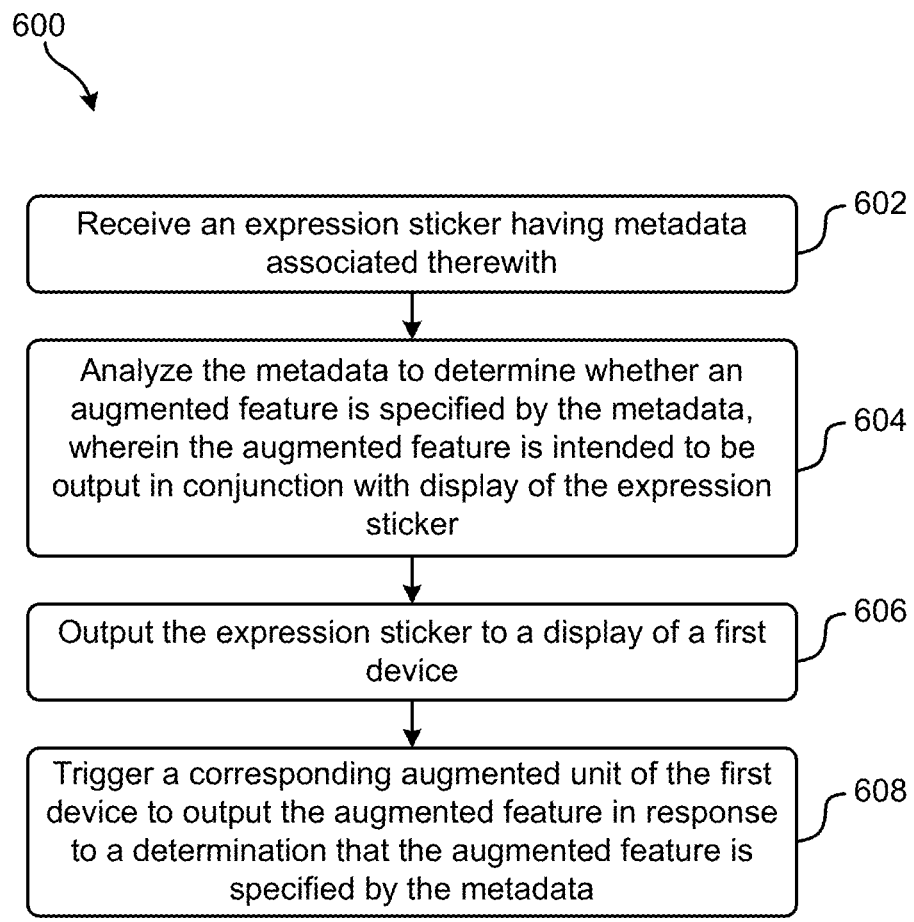
FIG. 6 shows a flowchart of a method, according to one embodiment.

Now referring to FIG. 6, a method 600 is shown according to one embodiment. The method 600 may be performed in accordance with the present invention in any of the environments depicted in FIGS. 1-5, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by an expression sticker management device 502 as shown in FIG. 5, a cloud server, a portable computer, a handheld or wearable computer, a processing circuit having one or more processors therein, or some other device having one or more processors therein. Referring again to FIG. 6, the processing circuit, e.g., processor(s), chip(s), and/or module(s) implemented in hardware and/or software, and preferably having at least one hardware component, may be utilized in any device to perform one or more steps of the method 600. Illustrative processors include, but are not limited to, a microprocessor, a CPU, an ASIC, a FPGA, etc., combinations thereof, or any other suitable computing device known in the art.

As shown in FIG. 6, method 600 may start with operation 602, where an expression sticker having metadata associated therewith is received on a first device. The first device is a receiver device which is configured to receive expression stickers. The first device may be any device known in the art that is capable of outputting an expression sticker on a display thereof, such as a mobile phone, a smartphone, a personal computer (PC), a laptop computer, a notebook computer, a tablet computer, a smartwatch, other wearable or portable devices that have a display screen, etc.

The expression sticker in its entirety may be received, or just an indication of the expression sticker may be received. In the latter approach, the first device has stored thereon, prior to receipt of the indication, information that correlates the indication to data stored to the first device that enables the expression sticker to be output to the display, thereby rendering the expression sticker on the first device after receipt of the indication.

The metadata and expression sticker may be formatted in accordance with an augmented expression sticker data structure, such that augmented features desired to be output with the expression sticker are indicated by the metadata.

In one embodiment, the metadata may be formatted as a series of augmented unit identifiers followed by corresponding bit values indicating whether the augmented unit is to be activated or not with output of the expression sticker. In a further embodiment, a multi-bit value may be included with one or more of the augmented unit identifiers that may indicate an aspect of the augmented unit, such as an intensity (e.g., light brightness, vibration strength, etc.), a duration, a pattern for activation (e.g., flashing light pattern, vibration pattern, etc.), a color to display (e.g., red, green, yellow, etc.), which scent or smell to output (e.g., citrus, flower, chocolate, etc.), which taste or flavor to output (e.g., chocolate, sweet, salty, bitter, etc.), or some other discernible aspect of the augmented unit or augmented feature that may be indicated and enacted on the receiving device.

In operation 604, the metadata is analyzed to determine whether an augmented feature is specified by the metadata. The augmented feature is intended to be output in conjunction with display of the expression sticker.

In various embodiments, the augmented feature may include any of the following: displaying additional colors with the expression sticker on the display of the first device, emitting a taste or flavor from the first device, producing a scent or smell from the first device, vibrating the first device, causing one or more lights located externally on the first device to activate, etc.

The augmented feature is output by an augmented unit on the first device. The augmented unit that is to be used to output the augmented feature is determined based on what augmented feature is specified by the metadata.

In operation 606, the expression sticker is output to a display of the first device. This display of the expression sticker may be performed in accordance with any known technique for displaying expression stickers, such as inline with a conversation or chat thread, as a pop-up, in a separate window within a social media application, etc. The colors of the expression sticker, shape, any associated text, etc., is specified by the expression sticker or indication thereof that is received by the first device.

In operation 608, a corresponding augmented unit of the first device is triggered to output the augmented feature in response to a determination that the augmented feature is specified by the metadata.

The augmented unit may include any of the following in various approaches: the display of the first device, a flavor emitter of the first device, a scent emitter of the first device, a vibration module of the first device, one or more external lights of the first device, etc., and is based on which augmented feature is specified in the metadata.

In one embodiment, method 600 may include receiving input from a user of the first device via a user interface, such as a keyboard, a mouse or trackball, a touchscreen display, an audio microphone, a transceiver, etc. The input configures management and control of augmented expression stickers on the first device, such that how the augmented features are utilized, how often they are output, a duration of output, an intensity of output, etc., may be specified by the user according to his or her own preferences.

In another embodiment, method 600 may include receiving indication that a user of the first device has requested to send an expression sticker to a second device. In response to such indication (such as within a chat thread, IM, etc.), a current emotional mode and a corresponding emotional level of the user are determined based on evaluation of emotional factors of the user.

The emotional mode of the user is the emotional state or status at any particular time, e.g., whether user is happy, mad, sad, upset, distraught, worried, silly, mourning, determined, confused, etc.

The emotional level is associated with whichever emotional mode is determined, and dictates how strongly the user is feeling a particular emotional state at any given time, e.g., very unhappy, mildly confused, strongly disgusted, etc. The emotional level may be indicated on a predetermined scale, e.g., 1-3, 1-6, 1-10, as a percentage, as a single bit (e.g., 0 for regular level, 1 for strong level), etc.

In a further embodiment, the emotional factors of the user may be determined by any of the following: tracking and analyzing context of one or more conversations from one or more chat threads engaged in by the user, capturing and analyzing facial expressions of the user while interacting with the first device, analyzing a voice volume of the user while interacting with the first device, etc. These emotional factors may provide insight into an emotional state (emotional mode) of the user at any given time.

The context of one or more conversations from one or more chat threads may include indications of anger or excitement (use of exclamation points, use of capital letters, use of red font, use of curse words etc.), indications of confusion (use of question marks, use of questioning phrases, etc.), use of common text and chat abbreviations which indicate a particular emotion or mental state (e.g., WTF, LOL, ILY, YOLO, etc.), etc.

The facial expressions of the user while interacting with the first device may be captured using a camera of the first device, and may reflect a user's emotion at any particular time. For example, a user who is crying may be sad, a user who is red in the face may be embarrassed or angry, a user who has uplifted eyebrows may be surprised or shocked, a user who has a hand on his or her forehead may be flustered, etc.

The volume of the user's voice while interacting with the first device, whether directly by commanding the first device or entering data via voice-to-text, may be indicative of the user's current emotional state, and may provide a level of that emotion. For example, a user yelling at another person while on a telephone call may indicate anger, a user giggling while reading a text may indicate happiness or silliness, a user rolling his or her eyes while entering a text may indicate disbelief, etc.

All of these various clues (emotional factors) may be used to determine a user's emotion (emotional mode) at any given time, along with a level of that emotion (emotional level). Moreover, more than one emotion may be present based on the user's interactions with the first device, and may be included with the expression sticker.

From the emotional factors of the user, second metadata may be created that indicates the current emotional mode and the corresponding emotional level for the user. Moreover, in response to more than one emotion being present based on the user's interactions with the first device, more than one emotional mode and emotional level are included in the second metadata. Once the second metadata is determined, the second expression sticker associated with the second metadata is sent to the second device (in some embodiments, an indication of the second expression sticker may be sent with the metadata, assuming that the second device has the data to reproduce the second expression sticker upon receiving the indication).

In one approach, in response to more than one augmented feature being specified by the metadata, method 600 may include determining a set of augmented units to use to output the more than one augmented feature and determining whether one or more of the set of augmented units are unavailable on the first device. In this way, the method of outputting a specified augmented feature is determined, and then a capacity of the first device to provide this method of outputting is determined. Then, only available augmented units of the first device are triggered to output the more than one augmented features in response to a determination that one or more augmented units are unavailable on the first device. In this way, the expression sticker is displayed and available augmented features are utilized in outputting of the expression sticker, so that the inability of the first device to output certain augmented features does not defeat the ability to output those augmented features which are available. Accordingly, augmented features that correspond to the one or more augmented units that are unavailable on the first device are not output on the first device.

Method 600 may be implemented in a system and/or a computer program product. For example, a system may include a processing circuit and logic integrated with the processing circuit, executable by the processing circuit, or integrated with and executable by the processing circuit. By integrated with, what is meant is that the processing circuit is a hardware processor that has hardcoded logic included therewith, such as an ASIC, a FPGA, etc. By executable by, what is meant is that the processor is configured to execute software logic to achieve functionality dictated by the software logic. The logic is configured to cause the processing circuit to perform method 600.

In another example, a computer program product may include a computer readable storage medium having program instructions embodied therewith. The computer readable storage medium may be any suitable storage device known in the art that is configured to store and allow computer access to information stored therein. The embodied program instructions are executable by a processing circuit to cause the processing circuit to perform method 600.

Figure 7:
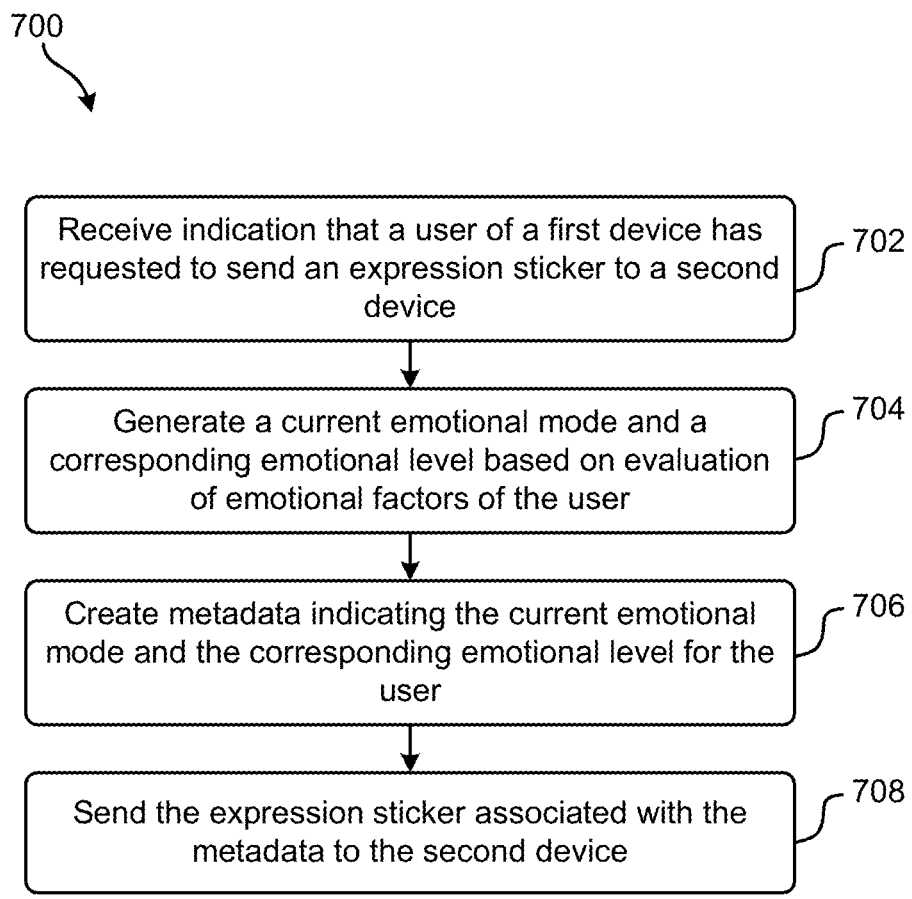
FIG. 7 shows a flowchart of a method, according to another embodiment.

Now referring to FIG. 7, a method 700 is shown according to one embodiment. The method 700 may be performed in accordance with the present invention in any of the environments depicted in FIGS. 1-5, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by a cloud server, a portable computer, a handheld or wearable computer, a processing circuit having one or more processors therein, or some other device having one or more processors therein. The processing circuit, e.g., processor(s), chip(s), and/or module(s) implemented in hardware and/or software, and preferably having at least one hardware component, may be utilized in any device to perform one or more steps of the method 700. Illustrative processors include, but are not limited to, a microprocessor, a CPU, an ASIC, a FPGA, etc., combinations thereof, or any other suitable computing device known in the art.

As shown in FIG. 7, method 700 may start with operation 702, where indication is received that a user of a first device has requested to send an expression sticker to a second device. In one embodiment, this indication may be a direct request on the first device to send the expression sticker in a conversation of a chat session, IM, social media application, etc. In another embodiment, this indication may be received from an intermediary device at a remote server which is configured to provide expression stickers, such as for use in conversations, chat sessions, IMs, social media applications, etc., in which case the requested expression sticker is provided to the first device and/or sent to the second device in response to the request.

In operation 704, a current emotional mode and a corresponding emotional level are generated and/or determined based on evaluation of emotional factors of the user.

In a further embodiment, the emotional factors of the user may be determined by any of the following: tracking and analyzing context of one or more conversations from one or more chat threads engaged in by the user, capturing and analyzing facial expressions of the user while interacting with the first device, analyzing a voice volume of the user while interacting with the first device, etc. These emotional factors may provide insight into an emotional state (emotional mode) of the user at any given time.

The context of one or more conversations from one or more chat threads may include indications of anger or excitement (use of exclamation points, use of capital letters, use of red font, use of curse words etc.), indications of confusion (use of question marks, use of questioning phrases, etc.), use of common text and chat abbreviations which indicate a particular emotion or mental state (e.g., WTF, LOL, ILY, IRL, YOLO, etc.), etc.

The facial expressions of the user while interacting with the first device may be captured using a camera of the first device, and may reflect a user's emotion at any particular time. For example, a user who is crying may be sad, a user who is red in the face may be embarrassed or angry, a user who has uplifted eyebrows may be surprised or shocked, a user who has a hand on his or her forehead may be flustered, etc.

The volume of the user's voice while interacting with the first device, whether directly by commanding the first device or entering data via voice-to-text, may be indicative of the user's current emotional state, and may provide a level of that emotion. For example, a user yelling at another person while on a telephone call may indicate anger, a user giggling while reading a text may indicate happiness or silliness, a user rolling his or her eyes while entering a text may indicate disbelief, etc.

All of these various clues (emotional factors) may be used to determine a user's emotion (emotional mode) at any given time, along with a level of that emotion (emotional level). Moreover, more than one emotion may be present based on the user's interactions with the first device, and may be included with the expression sticker.

In operation 706, metadata indicating the current emotional mode and the corresponding emotional level for the user is created. The metadata may take any format, such as a list, a series of type-length-value (TLV) entries, a table, etc. In one embodiment, the metadata may be formatted as a series of augmented unit identifiers followed by corresponding bit values indicating whether the augmented unit is to be activated or not with output of the expression sticker. In a further embodiment, a multi-bit value may be included with one or more of the augmented unit identifiers that may indicate an aspect of the augmented unit, such as an intensity (e.g., light brightness, vibration strength, etc.), a duration, a pattern for activation (e.g., flashing light pattern, vibration pattern, etc.), a color to display (e.g., red, green, yellow, etc.), which scent or smell to output (e.g., citrus, flower, chocolate, etc.), which taste or flavor to output (e.g., chocolate, sweet, salty, bitter, etc.), or some other discernible aspect of the augmented unit or augmented feature that may be indicated and enacted on the receiving device.

In another embodiment, from the emotional factors of the user, the metadata may be created that indicates the current emotional mode and the corresponding emotional level for the user. Moreover, in response to more than one emotion being present based on the user's interactions with the device, more than one emotional mode and emotional level are included in the metadata.

In operation 708, the expression sticker associated with the metadata is sent to the second device. In some embodiments, an indication of the expression sticker may be sent with the metadata, assuming that the second device has the data to reproduce the expression sticker upon receiving the indication.

Method 700 may be implemented in a system and/or a computer program product. For example, a system may include a processing circuit and logic integrated with the processing circuit, executable by the processing circuit, or integrated with and executable by the processing circuit. By integrated with, what is meant is that the processing circuit is a hardware processor that has hardcoded logic included therewith, such as an ASIC, a FPGA, etc. By executable by, what is meant is that the processor is configured to execute software logic to achieve functionality dictated by the software logic. The logic is configured to cause the processing circuit to perform method 700.

In another example, a computer program product may include a computer readable storage medium having program instructions embodied therewith. The computer readable storage medium may be any suitable storage device known in the art that is configured to store and allow computer access to information stored therein. The embodied program instructions are executable by a processing circuit to cause the processing circuit to perform method 700.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:
1. A system, comprising:
a processing circuit; and
logic integrated with the processing circuit, executable by the processing circuit, or integrated with and executable by the processing circuit, the logic being configured to cause the processing circuit to:
receive an expression sticker having metadata associated therewith;
analyze the metadata to determine whether an augmented feature is specified by the metadata, wherein the augmented feature is intended to be output in conjunction with display of the expression sticker;

output the expression sticker to a display of a first device;

trigger a corresponding augmented unit of the first device to output the augmented feature in response to a determination that the augmented feature is specified by the metadata and a determination that user specific rules of an expression sticker management service profile stored on memory of the first device allow the augmented feature to be available to a user of the first device;

receive indication that the user has requested to send a second expression sticker to a second device;

in response to receiving the indication, generate a current emotional mode and a corresponding emotional level based on an evaluation of emotional factors of the user;

create second metadata indicating the current emotional mode and the corresponding emotional level of the user;

send the second expression sticker associated with the second metadata to the second device, wherein the second expression sticker is available to the user based on user experience of the user as specified in the expression sticker management service profile;

send a first request to an expression sticker resource, the first request including an offer to trade for a third expression sticker, wherein the third expression sticker is not already included in an expression sticker collection of the first device prior to sending the first request;

receive the third expression sticker; and add the third expression sticker to the expression sticker collection.

2. The system as recited in claim 1, wherein the logic is further configured to cause the processing circuit to:

determine the emotional factors of the user by analyzing a voice volume of the user while interacting with the first device.

3. The system as recited in claim 2, wherein the augmented feature is a tasteable flavor.

4. The system as recited in claim 3, wherein the augmented unit of the first device is a flavor emitter that is configured to emit a sample of the tasteable flavor to the user, wherein generating the current emotional mode and the corresponding emotional level includes accessing a context log that includes determined current emotional modes of the user, wherein the determined current emotional modes correspond to a plurality of different segments of conversations of the user in one or more chat threads.

5. The system as recited in claim 1, wherein more than one augmented feature is specified by the metadata associated with the received expression sticker, and wherein the logic is further configured to cause the processing circuit to:

determine a set of augmented units to use to output the more than one augmented feature;

determine whether one or more of the set of augmented units are unavailable on the first device; and trigger only available augmented units of the first device to output the more than one augmented features in response to a determination that one or more augmented units are unavailable on the first device, with the proviso that augmented features that correspond to the one or more augmented units that are unavailable on the first device are not output on the first device.

6. A method, comprising:

receiving an expression sticker having metadata associated therewith;

analyzing the metadata to determine whether an augmented feature is specified by the metadata, wherein the augmented feature is intended to be output in conjunction with display of the expression sticker;

outputting the expression sticker to a display of a first device;

triggering a corresponding augmented unit of the first device to output the augmented feature in response to a determination that the augmented feature is specified by the metadata and a determination that user specific rules of an expression sticker management service profile stored on memory of the first device allow the augmented feature to be available to a user of the first device, wherein the augmented feature is a tasteable flavor, wherein the augmented feature is based on current environmental conditions of a second user;

sending a first request to an expression sticker resource, the first request including an offer to trade for a second expression sticker, wherein the second expression sticker is not already included in an expression sticker collection of the first device prior to sending the first request;

receiving the second expression sticker; and adding the second expression sticker to the expression sticker collection.

7. The method as recited in claim 6, wherein the augmented unit of the first device is a flavor emitter that is configured to emit a sample of the tasteable flavor to the user.

8. The method as recited in claim 6, further comprising:

generating emotional factors of the user, wherein the emotional factors correspond to a plurality of different segments of conversations of the user in one or more chat threads;

storing the generated emotional factors in a context log;

receiving indication that the user has requested to send a third expression sticker to a second device;

accessing the emotional factors of the context log to determine a current emotional mode and a corresponding emotional level of the user;

recommending a plurality of expression stickers that are related to the determined current emotional mode and the corresponding emotional level of the user, wherein the plurality of recommended expression stickers includes the third expression sticker;

receiving indication that the user has selected the third expression sticker; and sending the third expression sticker to the second device.

9. The method as recited in claim 8, further comprising:

determining the emotional factors of the user by capturing and analyzing facial expressions of the user while interacting with the first device.

10. The method as recited in claim 6, wherein more than one augmented feature is specified by the metadata, the method further comprising:

determining a set of augmented units to use to output the more than one augmented feature;

determining whether one or more of the set of augmented units are unavailable on the first device; and triggering only available augmented units of the first device to output the more than one augmented features in response to a determination that one or more augmented units are unavailable on the first device, with the proviso that augmented features that correspond to the one or more augmented units that are unavailable on the first device are not output on the first device.

11. A computer program product, the computer program product comprising a computer readable storage medium having program instructions embodied therewith, wherein the computer readable storage medium is not a transitory signal per se, the embodied program instructions being executable by a processing circuit to cause the processing circuit to:
receive, by the processing circuit, an expression sticker having metadata associated therewith;
analyze, by the processing circuit, the metadata to determine whether an augmented feature is specified by the metadata, wherein the augmented feature is intended to be output in conjunction with display of the expression sticker;
output, by the processing circuit, the expression sticker to a display of a first device;
trigger, by the processing circuit, a corresponding augmented unit of the first device to output the augmented feature in response to a determination that the augmented feature is specified by the metadata and a determination that user specific rules of an expression sticker management service profile stored on memory of the first device allow the augmented feature to be available to a user of the first device;
receive, by the processing circuit, indication that the user has requested to send a second expression sticker to a second device;
generate, by the processing circuit, a current emotional mode and a corresponding emotional level based on an evaluation of emotional factors of the user;
create, by the processing circuit, second metadata indicating the current emotional mode and the corresponding emotional level for the user; and
send, by the processing circuit, the second expression sticker associated with the second metadata to the second device,
wherein the second expression sticker is available to the user based on a user type of the user as specified in the expression sticker management service profile;
send, by the processing circuit, a first request to an expression sticker resource, the first request including an offer to trade for a third expression sticker,
wherein the third expression sticker is not already included in an expression sticker collection of the first device prior to sending the first request;
receive, by the processing circuit, the third expression sticker; and
add, by the processing circuit, the third expression sticker to the expression sticker collection.

12. The computer program product as recited in claim 11, wherein the embodied program instructions are further executable by the processing circuit to cause the processing circuit to:
receive, by the processing circuit, a request to trade the expression sticker, wherein the request is received from the expression sticker resource.

13. The computer program product as recited in claim 11, wherein the embodied program instructions are further executable by the processing circuit to cause the processing circuit to:
determine, by the processing circuit, the emotional factors of the user by performing at least one action selected from a group consisting of: tracking and analyzing context of one or more conversations from one or more chat threads engaged in by the user, capturing and analyzing facial expressions of the user while interacting with the first device, and analyzing a voice volume of the user while interacting with the first device.

14. The computer program product as recited in claim 11, wherein the augmented feature is based on current environmental conditions of a second user.

15. The computer program product as recited in claim 11, wherein more than one augmented feature is specified by the metadata associated with the received expression sticker, and wherein the embodied program instructions are further executable by the processing circuit to cause the processing circuit to:
determine, by the processing circuit, a set of augmented units to use to output the more than one augmented feature;
determine, by the processing circuit, whether one or more of the set of augmented units are unavailable on the first device; and
trigger, by the processing circuit, only available augmented units of the first device to output the more than one augmented features in response to a determination that one or more augmented units are unavailable on the first device, with the proviso that augmented features that correspond to the one or more augmented units that are unavailable on the first device are not output on the first device.

16. The computer program product as recited in claim 11, wherein the augmented feature is a tasteable flavor,
wherein the augmented unit of the first device is a flavor emitter that is configured to emit a sample of the tasteable flavor to the user .

17. The system as recited in claim 3, wherein the augmented feature is based on current environmental conditions of a second user.

18. The system as recited in claim 4, wherein the determined current emotional modes correspond to a plurality of segments of conversations of the user in a plurality of chat threads, wherein the second expression sticker is available to the user based on a user type of the user as specified in the expression sticker management service profile.

19. The computer program product as recited in claim 11, wherein the augmented feature is based on current environmental conditions of a second user, wherein the augmented feature is received from the second device based on a request by the second user.

* * * * *